US011481793B2

(12) United States Patent
Leddy, III et al.

(10) Patent No.: US 11,481,793 B2
(45) Date of Patent: Oct. 25, 2022

(54) SYSTEM, METHOD, AND COMPUTER PROGRAM PRODUCT FOR PROVIDING REAL-TIME OFFERS BASED ON GEOLOCATION AND MERCHANT CATEGORY

(71) Applicant: Visa International Service Association, San Francisco, CA (US)

(72) Inventors: William Joseph Leddy, III, Lakeway, TX (US); Hongqin Song, Austin, TX (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 16/801,573

(22) Filed: Feb. 26, 2020

(65) Prior Publication Data

US 2021/0264453 A1    Aug. 26, 2021

(51) Int. Cl.
| G06Q 30/00 | (2012.01) |
| G06Q 30/02 | (2012.01) |
| G06N 20/00 | (2019.01) |
| H04W 4/021 | (2018.01) |
| H04W 4/029 | (2018.01) |

(52) U.S. Cl.
CPC ......... *G06Q 30/0205* (2013.01); *G06N 20/00* (2019.01); *G06Q 30/0201* (2013.01); *G06Q 30/0259* (2013.01); *H04W 4/021* (2013.01); *H04W 4/029* (2018.02)

(58) Field of Classification Search
CPC .......... G06Q 30/0205; G06Q 30/0201; G06Q 30/0259; H04W 4/029; H04W 4/021; G06N 20/00
See application file for complete search history.

(56) References Cited

U.S. PATENT DOCUMENTS

| 8,522,270 B2 | 8/2013 | Chatter et al. |
| 9,990,643 B2 | 6/2018 | Yoder et al. |
| 10,354,260 B2 | 7/2019 | Thomas et al. |
| 2012/0197726 A1* | 8/2012 | Aggarwal ............ G06Q 30/02 705/14.64 |
| 2012/0323674 A1 | 12/2012 | Simmons et al. |

(Continued)

FOREIGN PATENT DOCUMENTS

| EP | 2690592 A1 * | 1/2014 | ......... G06Q 30/0601 |
| WO | WO-2015200578 A1 * | 12/2015 | ......... G06Q 30/0239 |

OTHER PUBLICATIONS

Rao; Assessing_the_business_impact_of_location_based_services; ICSS 2004; 8 pages; 2004.*

(Continued)

*Primary Examiner* — Radu Andrei
(74) *Attorney, Agent, or Firm* — The Webb Law Firm

(57) ABSTRACT

Provided is a computer-implemented method for providing real-time offers based on geolocation and merchant category. Transaction data for transaction from a plurality of merchants is received. A subset of merchants is determined based on the physical location of the merchants and the merchant category of the merchants. Real-time market activity data is determined for each of the merchants in the subset of merchants. A real-time offer is initiated based on comparing the market activity data of at least one merchant compared to the market activity data of a first merchant.

15 Claims, 4 Drawing Sheets

(56) References Cited

U.S. PATENT DOCUMENTS

| | | | |
|---|---|---|---|
| 2014/0365301 A1 | 12/2014 | Rappoport et al. | |
| 2015/0058076 A1* | 2/2015 | Left | G06Q 30/0201 |
| | | | 705/7.29 |
| 2015/0058140 A1* | 2/2015 | Dixon | G06Q 30/0277 |
| | | | 705/14.73 |
| 2015/0088607 A1* | 3/2015 | Georgoff | G06Q 30/0267 |
| | | | 705/14.46 |
| 2015/0169726 A1* | 6/2015 | Kara | G06F 16/26 |
| | | | 707/737 |
| 2016/0125519 A1* | 5/2016 | Sundaresan | G06Q 30/0631 |
| | | | 705/26.3 |
| 2018/0247319 A1 | 8/2018 | Yoder et al. | |
| 2018/0276710 A1 | 9/2018 | Tietzen et al. | |
| 2019/0385191 A1* | 12/2019 | Becus | G06Q 30/0249 |
| 2020/0100165 A1* | 3/2020 | Hosier, Jr. | B66B 1/34 |

OTHER PUBLICATIONS

Saluwadana; A_Mobile_App_for_Location_Based_Customer_Notifications_About_Sales_Offers; ICAC 2019; pp. 116-121; 2019.*

\* cited by examiner

SYSTEM, METHOD, AND COMPUTER PROGRAM PRODUCT FOR PROVIDING REAL-TIME OFFERS BASED ON GEOLOCATION AND MERCHANT CATEGORY

BACKGROUND OF THE INVENTION

1. Field of the Invention

This invention relates generally to systems, devices, products, apparatus, and methods for providing real-time offers, and one particular embodiment, to a system, method and computer program product for providing real-time offers based on geolocation and merchant category.

2. Technical Considerations

A merchant in a particular merchant category may often be located near other merchants within that same merchant category. Merchants may expect to receive a certain portion of the business within a merchant category in a particular geographic area. Offers to potential customers may be used to entice customers to go to the merchant instead of the merchant's competitors.

The use of offers may be more efficient if they are utilized when a merchant's transactions are below an expected market share of all of the transactions of merchants within the merchant category located near the merchant. While merchants may be able to gauge how their transactions compare to their average amount of transactions, they are often unable to determine the amount of transactions that their competitors are experiencing in real-time. A decrease in customers at a merchant's location may indicate that a merchant's customers are going to a competitor, or it could indicate that there is simply a decrease in customers going to all merchants within that merchant category. An increase in customers may indicate that customers are leaving the competitors and going to the merchant's establishment, or it could indicate that there is a larger than usual number of customers going to all merchants within the merchant category. The use of offers when there are few potential customers may not be as efficient as the use of offers when there is a surplus of available customers. Being able to provide offers based on the share of the market that the merchant is experience in real-time would provide a more efficient use of offers that would increase revenues and profits for merchants.

SUMMARY OF THE INVENTION

Accordingly, it is an object of the present invention to provide systems, devices, products, apparatus, and/or methods for providing offers based on real-time data that overcomes some or all of the deficiencies of the prior art.

According to a non-limiting embodiment, provided is a computer-implemented method for providing offers based on real-time data. The method may comprise receiving, with at least one processor, transaction data associated with a plurality of transactions conducted by a plurality of merchants, each merchant of the plurality of merchants associated with a physical location and at least one merchant category, the plurality of merchants comprising a first merchant associated with at least one first merchant category; determining, with at least one processor, a subset of merchants of the plurality of merchants that are: (i) associated with physical locations within a threshold distance of a physical location associated with the first merchant and (ii) associated with the at least one first merchant category; determining, with at least one processor, real-time market activity data associated with the first merchant and each merchant of the subset of merchants; and determining, with at least one processor, to initiate at least one offer based on comparing the real-time market activity data associated with the first merchant with the real-time market activity data associated with at least one other merchant.

In non-limiting embodiments or aspects, determining the subset of merchants may comprise generating, with at least one processor, geographical coordinates for each merchant of the plurality of merchants based on a geohash algorithm; generating, with at least one processor, a merchant index comprising the geographical coordinates for each merchant; identifying, with at least one processor, geographical coordinates for the first merchant; and determining, with at least one processor, at least one related merchant of the merchant index based on the geographical coordinates for the first merchant, the geographical coordinates of the at least one related merchant, and the threshold distance. Comparing the real-time market activity data may comprise generating, with at least one processor, a merchant-transaction index comprising at least one data structure comprising at least one transaction associated with a merchant identifier, a time stamp, and a transaction amount; calculating, with at least one processor, a first sum of all transactions within a threshold time period for each merchant of the plurality of merchants that match the merchant category and are within the threshold distance; calculating, with at least one processor, a second sum of all transactions for the first merchant within the threshold time period; calculating, with at least one processor, a total sum by adding the first sum to the second sum; and dividing, with at least one processor, the second sum by the total sum.

In non-limiting embodiments or aspects, the at least one offer may be continuously or continually ongoing, the method further comprising terminating the at least one offer in response to comparing real-time market activity data associated with the first merchant with real-time market activity data associated with at least one other merchant. Determining to initiate at least one offer may further comprise determining that a ratio of the real-time market activity data associated with the first merchant to the real-time market activity data associated with at least one other merchant satisfies a threshold amount. The method may further comprising determining the threshold amount based on historical transaction data and at least one machine learning algorithm. The method may further comprising determining the threshold amount based on a time or date.

In non-limiting embodiments or aspects, initiating the at least one offer may comprise communicating an advertisement to at least one computing device within a predetermined distance from the first merchant.

According to a non-limiting embodiment, provided is a system for providing offers based on real-time data, the system may comprise at least one server computer including at least one processor, the at least one server computer programed and/or configured to: receive transaction data associated with a plurality of transactions conducted by a plurality of merchants, each merchant of the plurality of merchants associated with a physical location and at least one merchant category, the plurality of merchants comprising a first merchant associated with at least one first merchant category; determine a subset of merchants of the plurality of merchants that are: (i) associated with physical locations within a threshold distance of a physical location associated with the first merchant and (ii) associated with the at least one first merchant category; determine real-time market activity data associated with the first merchant and each merchant of the subset of merchants; and determining whether to initiate at least one offer based on comparing the real-time market activity data associated with the first merchant with the real-time market activity data associated with at least one other merchant.

In non-limiting embodiments or aspects, the at least one server computer may be programed and/or configured to, when determining the subset of merchants, generate geographical coordinates for each merchant of the plurality of merchants based on a geohash algorithm; generate a merchant index comprising the geographical coordinates for each merchant; identify geographical coordinates for the first merchant; and determine at least one related merchant of the merchant index based on the geographical coordinates for the first merchant, the geographical coordinates of the at least one related merchant, and the threshold distance. The at least one server computer may be programed and/or configured to, when comparing the real-time market activity data, generate a merchant-transaction index comprising at least one data structure comprising at least one transaction associated with a merchant identifier, a time stamp, and a transaction amount; calculate a first sum of all transactions within a threshold time period for each merchant of the plurality of merchants that match the merchant category and are within the threshold distance; calculate a second sum of all transactions for the first merchant within the threshold time period; calculate a total sum by adding the first sum to the second sum; and divide the second sum by the total sum.

In non-limiting embodiments or aspects, the at least one offer may be continuously or continually ongoing, the server computer is further programed and/or configured to terminate the at least one offer in response to comparing real-time market activity data associated with the first merchant with real-time market activity data associated with at least one other merchant. The at least one server computer may be programed and/or configured to, when determining to initiate at least one offer, determine that a ratio of the real-time market activity data associated with the first merchant to the real-time market activity data associated with at least one other merchant satisfies a threshold amount. The at least one server computer may be programed and/or configured to, when initiating the at least one offer, communicate an advertisement to at least one computing device within a predetermined distance from the first merchant.

According to a non-limiting embodiment, provided is a computer program product for providing offers based on real-time data. The computer program product may comprise at least one non-transitory computer-readable medium including program instructions that, when executed by at least one processor, cause the at least one processor to: receive transaction data associated with a plurality of transactions conducted by a plurality of merchants, each merchant of the plurality of merchants associated with a physical location and at least one merchant category, the plurality of merchants comprising a first merchant associated with at least one first merchant category; determine a subset of merchants of the plurality of merchants that are: (i) associated with physical locations within a threshold distance of a physical location associated with the first merchant and (ii) associated with the at least one first merchant category; determine real-time market activity data associated with the first merchant and each merchant of the subset of merchants; and determine to initiate at least one offer based on comparing the real-time market activity data associated with the first merchant with the real-time market activity data associated with at least one other merchant.

In non-limiting embodiments or aspects, the program instructions may cause the at least one processor to, when determining the subset of merchants: generate geographical coordinates for each merchant of the plurality of merchants based on a geohash algorithm; generate a merchant index comprising the geographical coordinates for each merchant; identify geographical coordinates for the first merchant; and determine at least one related merchant of the merchant index based on the geographical coordinates for the first merchant, the geographical coordinates of the at least one related merchant, and the threshold distance. The program instructions may cause the at least one processor to, when determining the real-time market activity data: generate a merchant-transaction index comprising at least one data structure comprising at least one transaction associated with a merchant identifier, a time stamp, and a transaction amount; calculate a first sum of all transactions within a threshold time period for each merchant of the plurality of merchants that match the merchant category and are within the threshold distance; calculate a second sum of all transactions for the first merchant within the threshold time period; calculate a total sum by adding the first sum to the second sum; and divide the second sum by the total sum.

In non-limiting embodiments or aspects, the at least one offer may be continuously or continually ongoing, the program instructions further cause the at least one processor to terminate the at least one offer in response to comparing real-time market activity data associated with the first merchant with real-time market activity data associated with at least one other merchant. The program instructions may cause the at least one processor to, when determining to initiate at least one offer, determine that a ratio of the real-time market activity data associated with the first merchant to the real-time market activity data associated with at least one other merchant satisfies a threshold amount. The program instructions may cause the at least one processor to, when initiating the at least one offer, communicate an advertisement to at least one computing device within a predetermined distance from the first merchant.

Further embodiments or aspects are set forth in the following numbered clauses:

Clause 1: A computer-implemented method for providing offers based on real-time data, comprising: receiving, with at least one processor, transaction data associated with a plurality of transactions conducted by a plurality of merchants, each merchant of the plurality of merchants associated with a physical location and at least one merchant category, the plurality of merchants comprising a first merchant associated with at least one first merchant category; determining, with at least one processor, a subset of merchants of the plurality of merchants that are: (i) associated with physical locations within a threshold distance of a physical location associated with the first merchant and (ii) associated with the at least one first merchant category; determining, with at least one processor, real-time market activity data associated with the first merchant and each merchant of the subset of merchants; and determining, with at least one processor, to initiate at least one offer based on comparing the real-time market activity data associated with the first merchant with the real-time market activity data associated with at least one other merchant.

Clause 2: The computer-implemented method of clause 1, wherein determining the subset of merchants comprises: generating, with at least one processor, geographical coordinates for each merchant of the plurality of merchants based on a geohash algorithm; generating, with at least one processor, a merchant index comprising the geographical coordinates for each merchant; identifying, with at least one processor, geographical coordinates for the first merchant; and determining, with at least one processor, at least one related merchant of the merchant index based on the geographical coordinates for the first merchant, the geographical coordinates of the at least one related merchant, and the threshold distance.

Clause 3: The computer-implemented method of clause 1 or 2, wherein comparing the real-time market activity data comprises: generating, with at least one processor, a merchant-transaction index comprising at least one data structure comprising at least one transaction associated with a merchant identifier, a time stamp, and a transaction amount; calculating, with at least one processor, a first sum of all transactions within a threshold time period for each merchant of the plurality of merchants that match the merchant category and are within the threshold distance; calculating, with at least one processor, a second sum of all transactions for the first merchant within the threshold time period; calculating, with at least one processor, a total sum by adding the first sum to the second sum; and dividing, with at least one processor, the second sum by the total sum.

Clause 4: The computer-implemented method of any of clauses 1-3, wherein the at least one offer is continuously or continually ongoing, the method further comprising terminating the at least one offer in response to comparing real-time market activity data associated with the first merchant with real-time market activity data associated with at least one other merchant.

Clause 5: The computer-implemented method of any of clauses 1-4, wherein determining to initiate at least one offer further comprises determining that a ratio of the real-time market activity data associated with the first merchant to the real-time market activity data associated with at least one other merchant satisfies a threshold amount.

Clause 6: The computer-implemented method of any of clauses 1-5, further comprising determining the threshold amount based on historical transaction data and at least one machine learning algorithm.

Clause 7: The computer-implemented method of any of clauses 1-6, further comprising determining the threshold amount based on a time or date.

Clause 8: The computer-implemented method of any of clauses 1-7, wherein initiating the at least one offer comprises communicating an advertisement to at least one computing device within a predetermined distance from the first merchant.

Clause 9: A system for providing offers based on real-time data, the system comprising at least one server computer including at least one processor, the at least one server computer programed and/or configured to: receive transaction data associated with a plurality of transactions conducted by a plurality of merchants, each merchant of the plurality of merchants associated with a physical location and at least one merchant category, the plurality of merchants comprising a first merchant associated with at least one first merchant category; determine a subset of merchants of the plurality of merchants that are: (i) associated with physical locations within a threshold distance of a physical location associated with the first merchant and (ii) associated with the at least one first merchant category; determine real-time market activity data associated with the first merchant and each merchant of the subset of merchants; and determining whether to initiate at least one offer based on comparing the real-time market activity data associated with the first merchant with the real-time market activity data associated with at least one other merchant.

Clause 10: The system of clause 9, wherein the at least one server computer is programed and/or configured to, when determining the subset of merchants: generate geographical coordinates for each merchant of the plurality of merchants based on a geohash algorithm; generate a merchant index comprising the geographical coordinates for each merchant; identify geographical coordinates for the first merchant; and determine at least one related merchant of the merchant index based on the geographical coordinates for the first merchant, the geographical coordinates of the at least one related merchant, and the threshold distance.

Clause 11: The system of clause 9 or 10, wherein the at least one server computer is programed and/or configured to, when comparing the real-time market activity data: generate a merchant-transaction index comprising at least one data structure comprising at least one transaction associated with a merchant identifier, a time stamp, and a transaction amount; calculate a first sum of all transactions within a threshold time period for each merchant of the plurality of merchants that match the merchant category and are within the threshold distance; calculate a second sum of all transactions for the first merchant within the threshold time period; calculate a total sum by adding the first sum to the second sum; and divide the second sum by the total sum.

Clause 12: The system of any of clauses 9-11, wherein the at least one offer is continuously or continually ongoing, the server computer is further programed and/or configured to terminate the at least one offer in response to comparing real-time market activity data associated with the first merchant with real-time market activity data associated with at least one other merchant.

Clause 13: The system of any of clauses 9-12, wherein the at least one server computer is programed and/or configured to, when determining to initiate at least one offer, determine that a ratio of the real-time market activity data associated with the first merchant to the real-time market activity data associated with at least one other merchant satisfies a threshold amount.

Clause 14: The system of any of clauses 9-13, wherein the at least one server computer is programed and/or configured to, when initiating the at least one offer, communicate an advertisement to at least one computing device within a predetermined distance from the first merchant.

Clause 15: A computer program product for providing offers based on real-time data, comprising at least one non-transitory computer-readable medium including program instructions that, when executed by at least one processor, cause the at least one processor to: receive transaction data associated with a plurality of transactions conducted by a plurality of merchants, each merchant of the plurality of merchants associated with a physical location and at least one merchant category, the plurality of merchants comprising a first merchant associated with at least one first merchant category; determine a subset of merchants of the plurality of merchants that are: (i) associated with physical locations within a threshold distance of a physical location associated with the first merchant and (ii) associated with the at least one first merchant category; determine real-time market activity data associated with the first merchant and each merchant of the subset of merchants; and determine to initiate at least one offer based on comparing the real-time market activity data associated with the first merchant with the real-time market activity data associated with at least one other merchant.

Clause 16: The computer program product of clause 15, wherein the program instructions further cause the at least one processor to, when determining the subset of merchants: generate geographical coordinates for each merchant of the plurality of merchants based on a geohash algorithm; generate a merchant index comprising the geographical coordinates for each merchant; identify geographical coordinates for the first merchant; and determine at least one related merchant of the merchant index based on the geographical coordinates for the first merchant, the geographical coordinates of the at least one related merchant, and the threshold distance.

Clause 17: The computer program product of clause 15 or 16, wherein the program instructions further cause the at least one processor to, when determining the real-time market activity data: generate a merchant-transaction index comprising at least one data structure comprising at least one transaction associated with a merchant identifier, a time stamp, and a transaction amount; calculate a first sum of all transactions within a threshold time period for each merchant of the plurality of merchants that match the merchant category and are within the threshold distance; calculate a second sum of all transactions for the first merchant within the threshold time period; calculate a total sum by adding the first sum to the second sum; and divide the second sum by the total sum.

Clause 18: The computer program product of any of clauses 15-17, wherein the at least one offer is continuously or continually ongoing, the program instructions further cause the at least one processor to terminate the at least one offer in response to comparing real-time market activity data associated with the first merchant with real-time market activity data associated with at least one other merchant.

Clause 19: The computer program product of any of clauses 15-18, wherein the program instructions further cause the at least one processor to, when determining to initiate at least one offer, determine that a ratio of the real-time market activity data associated with the first merchant to the real-time market activity data associated with at least one other merchant satisfies a threshold amount.

Clause 20: The computer program product of any of clauses 15-19, wherein the program instructions further cause the at least one processor to, when initiating the at least one offer, communicate an advertisement to at least one computing device within a predetermined distance from the first merchant.

BRIEF DESCRIPTION OF THE DRAWINGS

Additional advantages and details of the invention are explained in greater detail below with reference to the exemplary embodiments that are illustrated in the accompanying schematic figures, in which.

DESCRIPTION OF THE INVENTION

Figure 1:
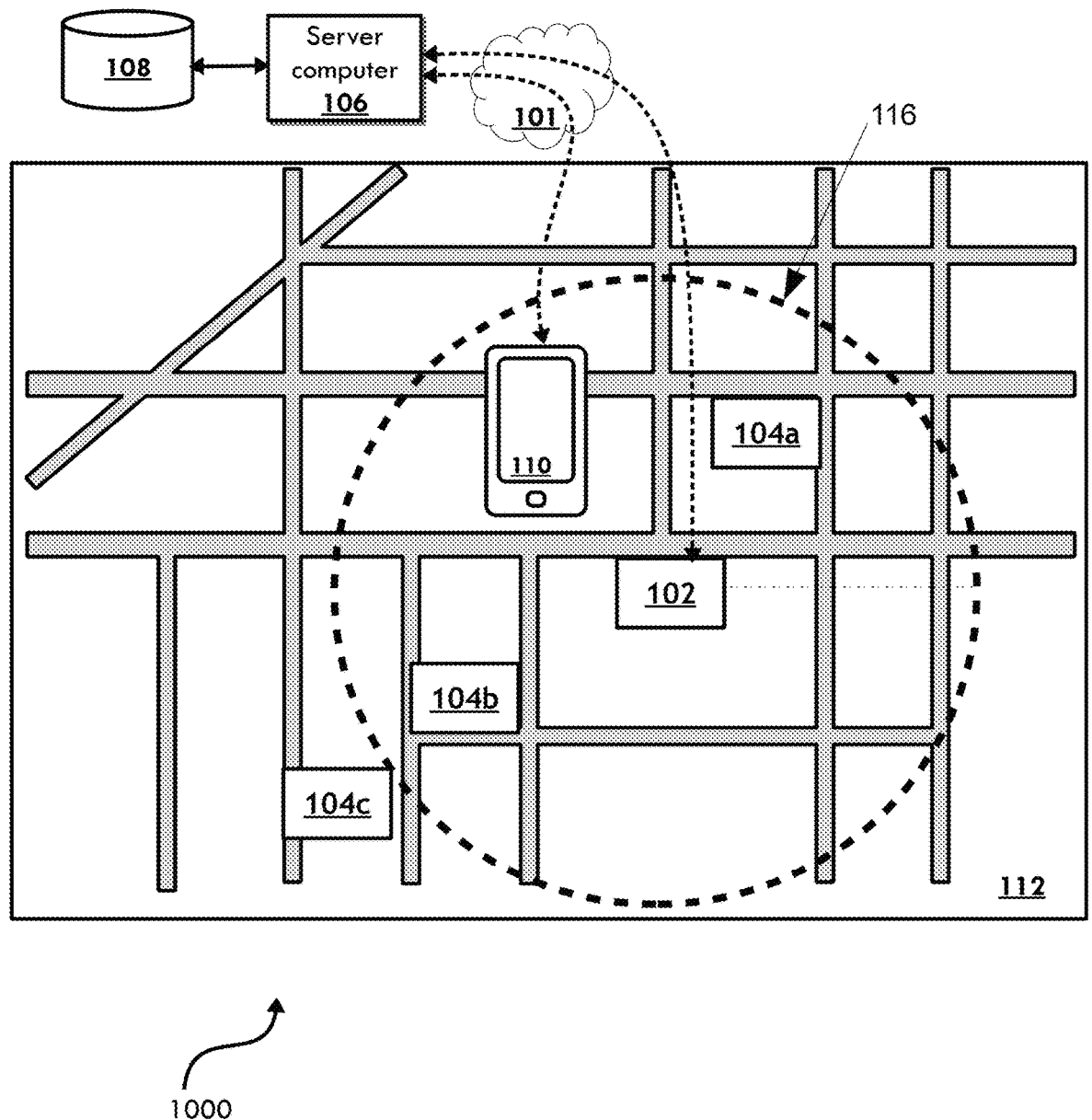
FIG. 1 is a schematic diagram of a system for providing offers based on real-time data according to a non-limiting embodiment.

For purposes of the description hereinafter, the terms "end," "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like, of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. It will be appreciated that numerous other arrangements are possible.

As used herein, the term "account identifier" may include one or more identifiers associated with an account of a user that identifies the account of the user. For example, an account identifier may include one or more primary account numbers (PANs), one or more tokens, and/or the like. Account identifiers may be alphanumeric or any combination of characters and/or symbols. In some non-limiting embodiments, an issuer institution may provide an account identifier (e.g., a PAN, a token, and/or the like) to a user that uniquely identifies one or more accounts associated with that user. The account identifier may be embodied on a physical financial instrument (e.g., a portable financial instrument, a payment card, a credit card, a debit card, and/or the like) and/or may be electronic information communicated to the user that the user may use for electronic payments. In some non-limiting embodiments, the account identifier may be an original account identifier, where the original account identifier was provided to a user at the creation of the account associated with the account identifier. In some non-limiting embodiments, the account identifier may be a supplemental account identifier that is provided to a user after the original account identifier was provided to the user. For example, if the original account identifier is forgotten, stolen, and/or the like, a supplemental account identifier may be provided to the user. In some non-limiting embodiments, an account identifier may be directly or indirectly associated with an issuer institution. For example, an account identifier may be a token that maps to a PAN or other identifier.

As used herein, the term "merchant" may refer to one or more entities (e.g., operators of retail businesses that provides goods and/or services, and/or access to goods and/or services, to a user (e.g., a customer, a consumer, a customer of the merchant, and/or the like) based on a transaction (e.g., a payment transaction). As used herein "merchant system" may refer to one or more computer systems operated by or on behalf of a merchant, such as a server computer executing one or more software applications. As used herein, the term "product" may refer to one or more goods and/or services offered by a merchant.

As used herein, a "point of sale (POS) device" may refer to one or more devices, which may be used by a merchant to initiate transactions (e.g., a payment transaction), engage in transactions, and/or process transactions. For example, a POS device may include one or more computers, peripheral devices, card readers, near-field communication (NFC) receivers, radio frequency identification (RFID) receivers, and/or other contactless transceivers or receivers, contact-based receivers, payment terminals, computers, servers, input devices, and/or the like.

As used herein, the term "transaction service provider" may refer to an entity that receives transaction authorization requests from merchants or other entities and provides guarantees of payment, in some cases through an agreement between the transaction service provider and the issuer institution. In some non-limiting embodiments, a transaction service provider may include a credit card company, a debit card company, and/or the like. As used herein, the term "transaction service provider system" may also refer to one or more computer systems operated by or on behalf of a transaction service provider, such as a transaction processing server executing one or more software applications. A transaction processing server may include one or more processors and, in some non-limiting embodiments, may be operated by or on behalf of a transaction service provider.

As used herein, the term "computing device" may refer to one or more electronic devices configured to process data, such as a processor (e.g., a CPU, a microcontroller, and/or any other data processor). A computing device may, in some examples, include the necessary components to receive, process, and output data, such as a display, a processor, a memory, an input device, and a network interface. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. The computing device may also be a desktop computer, POS device, electronic billboard, display device, broadcast device, or other form of non-mobile computer.

As used herein, the terms "client" and "client device" may refer to one or more client-side computing devices or systems (e.g., devices or systems that are remote from a server) used to initiate or facilitate a transaction (e.g., a payment transaction). As an example, a client device may refer to one or more POS devices used by a merchant, one or more acquirer host computers used by an acquirer, one or more user devices (e.g., one or more mobile devices or any other form of computing device), and/or the like. In some non-limiting embodiments, a client device may be an electronic device configured to communicate with one or more networks and initiate or facilitate transactions. Moreover, a client may also refer to an entity (e.g., a merchant, an acquirer, and/or the like) that owns, utilizes, and/or operates a client device for initiating transactions (e.g., for initiating transactions with a transaction service provider).

As used herein, the term "server" may refer to one or more computing devices (e.g., processors, storage devices, similar computer components, and/or the like) that communicate with client devices and/or other computing devices over a network (e.g., a public network, the Internet, a private network, and/or the like) and, in some examples, facilitate communication among other servers and/or client devices. It will be appreciated that various other arrangements are possible. As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

The term "offer," as used herein, may refer to an advertisement, discount, coupon, deal, promotion, and/or other like marketing activity. For example, an "offer" may be a targeted communication delivered via text message, push notification, web browser, telephone call, and/or the like to one or more users. The offer may be intended to benefit a merchant. The offer may be intended to encourage recipients to make a transaction with the merchant by, for example, providing a lower price, percentage discount, promotional item, and/or the like.

Non-limiting embodiments of the present invention are directed to systems, methods, and computer program products for providing offers to users and potential customers of a merchant. By leveraging transaction data and configurable merchant rules, non-limiting embodiments allow for offers to be automated for a particular merchant. By analyzing transaction data for multiple different merchants, and filtering such transaction data based on merchant inputs, preferences, geolocation, categories, and/or the like, offers may be triggered without additional input from a merchant at a time that maximizes the merchant's potential revenue. Non-limiting embodiments direct such offers from a transaction processing system, payment gateway, or some other system that is remote from the merchant system such as to leverage a wide array of data. Moreover, by filtering transaction data based on merchant rules, geolocation, and/or categories, merchant-specific data concerning other merchants does not have to be revealed and can remain anonymous. By providing the offers in real-time (e.g., based on current data and within seconds and/or minutes of the most current available data), the offers may be able to take advantage of dynamic conditions that affect the amount of business a merchant is experiencing. As used herein, the term "real-time offer" may refer to an offer that is provided to a user based on current transaction data (e.g., real-time market activity data, such as data including and/or being based on the transactions that occur within a predetermined time period (e.g., previous 10 minutes, previous hour, etc.) that is one hour or less and/or including a metric or set of metrics representing statistical information about the transaction data over the period of time and may be calculated continuously or periodically).

The offer may include an expiration time, the offer may be continuous, or the offer may expire upon notice. Offers are often used to encourage potential customers to go to a particular merchant. These offers may cause customers to go to the merchant instead of the merchant's competitors. By obtaining new customers, the merchant is able to increase their share of the market activity within the merchant's scope of business. A merchant may desire to keep their share of the activity in their local market above a particular level.

As a non-limiting example, a sporting event may have just ended, resulting in many people going to several different restaurants in the area. A particular restaurant (e.g., a first merchant) may experience an increase of customers compared to an average night, but due to the large number of people seeking the merchant category (e.g., restaurants) at the same time, the first merchant may still be experience a lower than average market share compared to other restaurants in the area. The lower than average market share may indicate the ability of the first merchant to further increase its business by providing real-time offers to take advantage of the increased pool of potential customers. Other advantages and benefits of non-limiting embodiments are described herein.

In FIG. 1, shown is a system 1000 for providing real-time offers based on geolocation and merchant category according to non-limiting embodiments. When a transaction occurs at a first merchant point-of-sale device 102, the transaction data may be communicated to a server computer 106. The server computer 106 may be controlled by a transaction service provider and/or in communication with a transaction processing system controlled by a transaction service provider. The other merchant point-of-sale devices 104a, 104b, 104c may also communicate transaction data to the server computer 106. In some examples, the server computer 106 may be a payment gateway that is in communication with a transaction processing system. In some non-limiting embodiments, the server computer 106 may be in communication with a transaction processing system that is in communication with the merchant devices 104a, 104b, 104c, such that the server computer 106 is in indirect communication with the merchant devices 104a, 104b, 104c. Various other arrangements are possible. The other merchants may be located in the surrounding geographic area 112 proximate the first merchant. The first merchant point-of-sale device 102 and other merchant point-of-sale devices 104a, 104b, 104c may communicate with the server computer 106 via one or more networks 101, such as the internet. In non-limiting embodiments, the first merchant point-of-sale device 102 and other merchant point-of-sale devices 104a, 104b, 104c may be client devices. The server computer 106 may be in communication with a transaction database 108.

In non-limiting embodiments, the server computer 106 may store the transaction data in the transaction database 108. The transaction database 108 may contain transaction data from a plurality of merchants. The transaction data may contain one or more merchant categories (e.g., as represented by a merchant category code (MCC), a North American Industry Classification System (NAICS) code, and/or a similarly standardized category code based on the types of goods or services that the merchant provides) of the merchant, merchant identifiers, account identifiers, geolocations, time stamps, and/or transaction amounts. In non-limiting embodiments, the server computer 106 may store aggregated and ordered datasets in the transaction database 108 using a global artificial intelligence platform as described in U.S. patent application Ser. No. 16/503,060, filed Jul. 3, 2019, entitled "Real-Time Global AI Platform," the entire disclosure of which is hereby incorporated by reference.

In further reference to FIG. 1, the server computer 106 may determine a subset of merchants within the transaction database that are within an area of interest 116 surrounding the physical location of a first merchant 102 and that match at least one of the merchant categories of the first merchant. The subset of merchants may be at least one merchant. In non-limiting embodiments, the subset of merchants may be determined based on a predetermined merchant category of the first merchant.

In non-limiting embodiments, the area of interest 116 may be determined based on a threshold distance from the first merchant or other predetermined location (e.g., 500 feet, 1 mile, 5 miles, etc.). For example, the area of interest 116 may include an area having a radius extending from the first merchant 102 for a threshold distance. The area of interest 116 may also include an area in which the shortest path (e.g., via roads and/or walkways) is within a threshold distance from the first merchant 102. The threshold distance may be predetermined, may be configured by the first merchant 102, and/or may be dynamically determined based on one or more parameters. In non-limiting embodiments, the area of interest 116 may be determined based on other geographical parameters, such as merchants on a particular street or set of streets, merchants within a particular zip code, merchants within a particular shopping complex, merchants within a particular city, and/or the like. In non-limiting embodiments, the subset of merchants is predetermined. In non-limiting embodiments, the first merchant may not be located within the area of interest 116. In non-limiting embodiments, the area of interest 116 may be determined based on the travel time to the first merchant. The travel time may be determined based on the estimated time to travel (e.g., walk, drive, bicycle, and/or the like) from the first merchant. In some non-limiting embodiments, the travel time may be estimated using third-party applications.

In non-limiting embodiments, the subset of merchants may be determined by generating or obtaining geographical coordinates for each merchant in the transaction database 108 based on a geohash algorithm. The server computer 106 may generate or obtain a merchant index that comprises the geographical coordinates of each merchant. The geographical coordinates of each merchant may be relative to the geographical location of the first merchant or, in other examples, may be based on global or localized coordinates. The geographical coordinates may include a geographical point comprising latitude and longitude bits. The server computer 106 may identify the geographical coordinates of the first merchant. The subset of merchants may then be determined based on the merchants located within a threshold distance from the first merchant based on the geographical coordinates. In some non-limiting embodiments, merchants located within a threshold distance from the first merchant may be considered to be related merchants.

In non-limiting embodiments, the server computer 106 may determine real-time market activity data of the first merchant based on data from the transaction database 108. The real-time market activity data may include and/or be based on the transactions that occur within a predetermined time period (e.g., previous 10 minutes, previous hour, etc.) that is one hour or less. The real-time market activity data may include a metric or set of metrics representing statistical information about the transaction data over the period of time and may be calculated continuously or periodically. For example, the real-time market activity data may be calculated at predetermined intervals (e.g., every 30 seconds, every 15 minutes, every hour, etc.). In some non-limiting examples, the real-time market activity data may be calculated in response to a request received from the first merchant. In non-limiting embodiments, the real-time market activity data may be determined based on the number and/or frequency of transactions that occur within the time period, the value of transactions that occur within the time period, and/or a combination of the number and/or frequency of transactions and value of transactions that occur within the time period. The server computer 106 may determine the real-time market activity data of each or all merchants within the subset of merchants and the first merchant. In some examples, the real-time activity data among the merchants may be relative. For example, the real-time activity data may include a ranking and/or distribution of merchants, one or more metrics relative to the first merchant, and/or a classification (e.g., busy, average, not busy, etc.).

In non-limiting embodiments, the server computer 106 may determine to initiate at least one real-time offer based on comparing the real-time activity data associated with the first merchant with the real-time activity data associated with at least one other merchant. The at least one other merchant may be a merchant within the subset of merchants. In non-limiting embodiments, the server computer 106 may determine to initiate at least one real-time offer if a real-time activity metric of the first merchant is lower than a real-time activity metric of another merchant (e.g., the first merchant had fewer transactions or lower value of transactions within the time period).

In non-limiting embodiments, the server computer 106 may determine to initiate at least one real-time offer if the market share of the first merchant satisfies a predetermined threshold (e.g., is less than and/or equal to the threshold). The server computer 106 may determine that the market share of the first merchant satisfies the threshold market share if the real-time activity of the first merchant satisfies a predetermined percentage of the total real-time activity of the first merchant and the subset of merchants.

In non-limiting embodiments, the server computer 106 may determine to initiate an offer if the number of transactions or value of the transactions of the first merchant within a predetermined time period satisfies (e.g., is less than and/or equal to) a predetermined threshold without comparing the values to other merchants.

In non-limiting embodiments, the server computer 106 may determine to initiate an offer by determining that a second merchant is taking market share from the first merchant (e.g., acquiring market share that the first merchant would otherwise have or would be expected to have). For example, it may be determined that the second merchant is taking market share from the first merchant if the number of transactions or value of transactions of the second merchant are increasing as the number of transactions or value of transactions of the first merchant are decreasing. The second merchant may be part of the plurality of merchants. The second merchant may be a predetermined merchant. The trend of increasing/decreasing number of transactions or value of transactions may be identified over a predetermined period of time (e.g., minutes, hours, days, weeks, etc.).

In non-limiting embodiments, comparing real-time market activity data may include generating a merchant-transaction index. The merchant-transaction index may include at least one data structure having stored therein transaction data of at least one transaction associated with a merchant identifier, transaction number, a time stamp, and/or a transaction amount. The sum of the transaction amounts and/or total number of transactions for all merchants in the subset of merchants may be calculated for the transactions that occurred within a threshold time period. The sum of the transaction amounts and/or total number of transactions for the first merchant may also be calculated for all transactions that occurred within a threshold time period. A total sum may be calculated by adding the first merchant sum to the subset merchant sum. The real-time market activity data may then be calculated by dividing the first merchant sum by the total sum. In non-limiting embodiments, the merchant-transaction index may utilize cumulative values for transaction number and transaction amount. The real-time market activity data may be calculated by subtracting the cumulative values at one time step by the cumulative values at another time step for each merchant. In non-limiting embodiments, comparing real-time market activity data may include comparing the first merchant sum to the subset merchant sum.

As a non-limiting example, if the market share threshold is a 60% share of the transactions within the merchant category and the first merchant had 40 transactions within the time period and all other merchants within the subset of merchants had 60 transactions within the same time period, the first merchant's market share would be only 40% of the transactions within the time period. In response to determining that the market share satisfies the threshold (e.g., is equal to or below the 60% threshold), the server computer automatically initiates an offer.

In non-limiting embodiments, the threshold market share is a predetermined value. The threshold value may also be determined using historical transaction data and at least one machine learning algorithm. The threshold value may also be dynamically determined. For example, the threshold value may change depending on the time or date (e.g., time of day, day of the week, day of the year, etc.), based on new historical data (e.g., recent transactions), and/or other parameters.

In non-limiting embodiments, the subset merchant sum may be a weighted sum. For example, the subset merchant sum may be weighted based on the distance of each merchant within the subset of merchants from the first merchant. The weight may be based on the inverse square of the distance. The subset merchant sum may be weighted based on the travel time between each merchant within the subset of merchants from the first merchant. The travel time may be determined based on the estimated time to travel (e.g., walk, drive, bicycle, and/or the like) to the location of the first merchant. In some non-limiting embodiments, the travel time may be estimated using third-party applications.

With continued reference to FIG. 1, the server computer 106 may initiate an offer by communicating with a user device 110 via one or more networks 101, such as the internet, utilizing one or more software applications on the user device 110. Such software applications may include, for example, a merchant application, a web browser, an email application, a third-party application, and/or the like. The server computer 106 may communicate with the user device 110 via text message (e.g., SMS, MMS, RCS and/or the like) or phone call. A user device 110 may include one or more computers, portable computers, tablet computers, cellular phones, landline phones, wearable devices (e.g., watches, glasses, lenses, clothing, and/or the like), personal digital assistants (PDAs), and/or the like. The server computer 106 may initiate offers to user devices 110 located within a threshold distance of the first merchant or based on other parameters. In non-limiting embodiments, the offer may be initiated for users based on the address of the user. The offer may also be initiated for users based on a predetermined list of users (e.g., users registered in a database). The threshold distance of the user devices 110 may be the same threshold distance as the threshold distance considered for the subset of merchants. In non-limiting embodiments, the threshold distance of the user devices 110 may be greater than or less than the threshold distance for the subset of merchants. In non-limiting embodiments, the user threshold distance may be a radial distance from the first merchant location, a route distance, or may be based on other geographical limitations such as users on a particular street or set of streets, users within a particular zip code, users within a particular city, and/or the like. In non-limiting embodiments, the user threshold distance may be predetermined. In other non-limiting embodiments, the user threshold distance may be dynamically determined using machine learning techniques, such as one or more artificial intelligence algorithms. In non-limiting embodiments, the server computer 106 may communicate with the user device 110 in order to initiate an offer through a radio broadcast, television broadcast, electronic billboard, and/or the like. In some non-limiting embodiments, the server computer 106 may communicate with the user device 110 to initiate an action of the user to initiate an offer (e.g., direct user to carry sign, spin sign, change letters on a sign, or some like other action).

In non-limiting embodiments, the offer is continuously or continually ongoing. In non-limiting embodiments, the offer remains active for a predetermined period of time. In non-limiting embodiments, the server computer 106 determines to terminate the offer based on comparing the real-time activity data associated with the first merchant with the real-time activity data associated with at least one other merchant. For example, if the market share of the first merchant does not satisfy the market share threshold to initiate the offer, the server computer 106 may determine to terminate the offer. In non-limiting embodiments, an additional offer may be initiated if the market share satisfies the market share threshold for initiating an offer for a predetermined amount of time. In non-limiting embodiments, there may be multiple thresholds, each threshold capable of initiating different and/or additional offers. In non-limiting embodiments, the threshold for terminating an offer may be greater than or less than the threshold for initiating the offer. In some non-limiting embodiments, the predetermined period of time may be determined based on historical transaction data and/or at least one machine learning algorithm.

In non-limiting embodiments, the type of offer (e.g., single item discount, percentage discount, combined item discounts, discount amounts, and/or the like) may be predetermined or may be dynamically determined. For example, in non-limiting embodiments, a machine learning algorithm may be used to determine the type of offer based on the effectiveness of previously made offers. The effectiveness may be determined from prior offers for the first merchant and/or the effectiveness may be determined from offers made for other merchants. The effectiveness may be determined based on the change in the number of transactions after the offer is initiated, an amount of transactions after the offer is initiated, a click-through rate of an offer, the amount of time between the initiation of the offer and an increase in the number or amount of transactions, and/or the like. The effectiveness may be determined based on the time and/or date of the initiation of the offer (e.g., it may be determined that particular offers are more effective in the evenings of weekdays as opposed to weekend mornings). The effectiveness may be determined based on the cost of the offer. In some examples, the effectiveness of an offer may be determined for more than one merchant, such as the overall effectiveness on all merchants of the same merchant category within the subset of merchants.

In non-limiting embodiments, the type and/or number of offers may be limited during predetermined time periods. The type and/or number of offers may be available only to a predetermined first merchant, or to a predetermined number of first merchants within a predetermined geographic area. The cost to the first merchant of the offer may be based on the demand for the offers. The cost to the first merchant of the offer may be based on the effectiveness of the offer, including the effectiveness the same offer type has had for the first merchant in previous offers, or the effectiveness the same offer type has had for merchants in the same merchant category.

Figure 2:
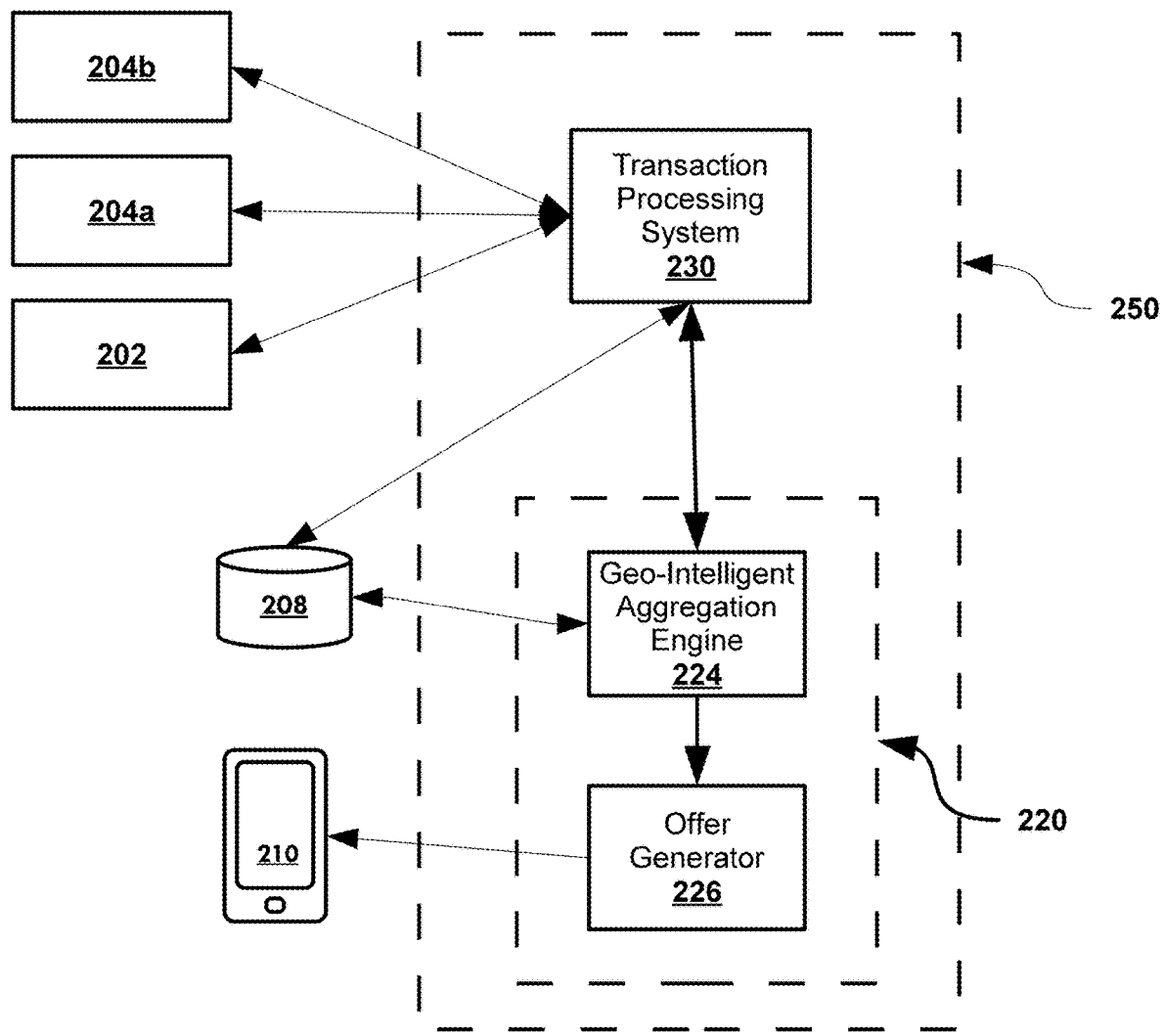
FIG. 2 is another schematic diagram of a system for providing offers based on real-time data according to a non-limiting embodiment.

Referring now to FIG. 2, shown in a non-limiting embodiment is a server computer system 250. The server computer system 250 may comprise a transaction processing system 230. The transaction processing system 230 may communicate with the point-of-sale device of a first merchant 202 as well as the point-of-sale devices of other merchants 204a, 204b. The transaction processing system 230 may receive transaction data from the point-of-sale devices of the first merchant 202 and the point-of-sale devices of other merchants 204a, 204b. The transaction data may include time of transaction, merchant identifier, account identifier, geolocation of merchant, and/or amount of transaction. The transaction processing system 230 may communicate the transaction data directly to a transaction database 208.

With continued reference to FIG. 2, in non-limiting embodiments, the transaction processing system 230 may communicate the transaction data to an offer system 220. In non-limiting embodiments, the offer system 220 may include a geo-intelligent aggregation engine 224 and an offer generator 226. The transaction processing system 230 may communicate with the geo-intelligent aggregation engine 224. The geo-intelligent aggregation engine 224 may include software and/or hardware configured to process, manage, and retrieve geographic data of the transaction communicated to the geo-intelligent aggregation engine 224 by the transaction processing system 230. The geo-intelligent aggregation engine 224 may include, for example, a software function executed by a control device or a remote server computer. In non-limiting embodiments, the geo-intelligent aggregation engine 224 may process, manage, and retrieve geographic interaction data as described in International Application Number PCT/US19/44986, filed Aug. 2, 2019, entitled "Real-Time Geo-Intelligent Aggregation Engine," the entire disclosure of which is hereby incorporated by reference.

With continued reference to FIG. 2, in non-limiting embodiments, before or after being processed with the geo-intelligent aggregation engine 224, the transaction data may be input into the transaction database 208 through communication with geo-intelligent aggregation engine 224. The geo-intelligent aggregation engine 224 may process transactions from the first merchant with transactions of other merchants within a subset of merchants in the transaction database 208. The subset of merchants may be determined based on the physical location of the merchants. The subset of merchants may be determined based on merchants located within a predetermined physical radial distance from the first merchant. The subset of merchants may be determined based on the merchant category of the first merchant and the merchant category of the other merchants. The subset of merchants may contain at least one merchant. The geo-intelligent aggregation engine 224 may process the transaction data and compare the transaction data from a predetermined period of time of the first merchant with the transaction data from the same period of time of the merchants of the subset of merchants. The geo-intelligent aggregation engine 224 may process and compare the transaction data continuously or continually.

With continued reference to FIG. 2, in non-limiting embodiments, the geo-intelligent aggregation engine 224 may determine to initiate an offer based on the comparison of the transaction data. The geo-intelligent aggregation engine 224 may communicate with an offer generator 226 to initiate an offer. The offer generator 226 may communicate an offer to at least one user device 210. The user device 210 may include one or more computers, portable computers, tablet computers, cellular phones, landline phones, wearable devices (e.g., watches, glasses, lenses, clothing, and/or the like), personal digital assistants (PDAs), and/or the like. The offer may be a predetermined offer. The offer may selected from a subset of offers depending on the comparison of the transaction data. The offer selected from the subset of offers may depend on the time or date that the offer is initiated. The offer generator 226 may communicate with the user device 210 via one or more networks, such as the Internet, utilizing one or more software applications on the device 210. Such software applications may include, for example, a merchant application, a web browser, an email application, a third-party application, and/or the like. The software applications may initiate offers in web browsers or applications through offers in banners or web browsers. The offer generator 226 may communicate with the user device 210 via text message (e.g., SMS, MMS, RCS and/or the like) or phone call. The offer generator 226 may communicate with the user device 210 in order to initiate an offer through a radio broadcast, television broadcast, electronic billboard, and/or the like. In some non-limiting embodiments, the offer generator 226 may communicate with the user device 210 to initiate an action of the user to initiate an offer (e.g., direct user to carry sign, spin sign, change letters on a sign, or some like other action).

With continued reference to FIG. 2, in non-limiting embodiments, the geo-intelligent aggregation engine 224 may determine to terminate an active offer based on the comparison of the transaction data. The geo-intelligent aggregation engine 224 may communicate with an offer generator 226 to terminate the offer, in response to which the offer generator 226 may stop offering the offer to user devices 210. The offer generator 226 may send a notification to the user device 210 to indicate that the offer is no longer valid.

Figure 3:
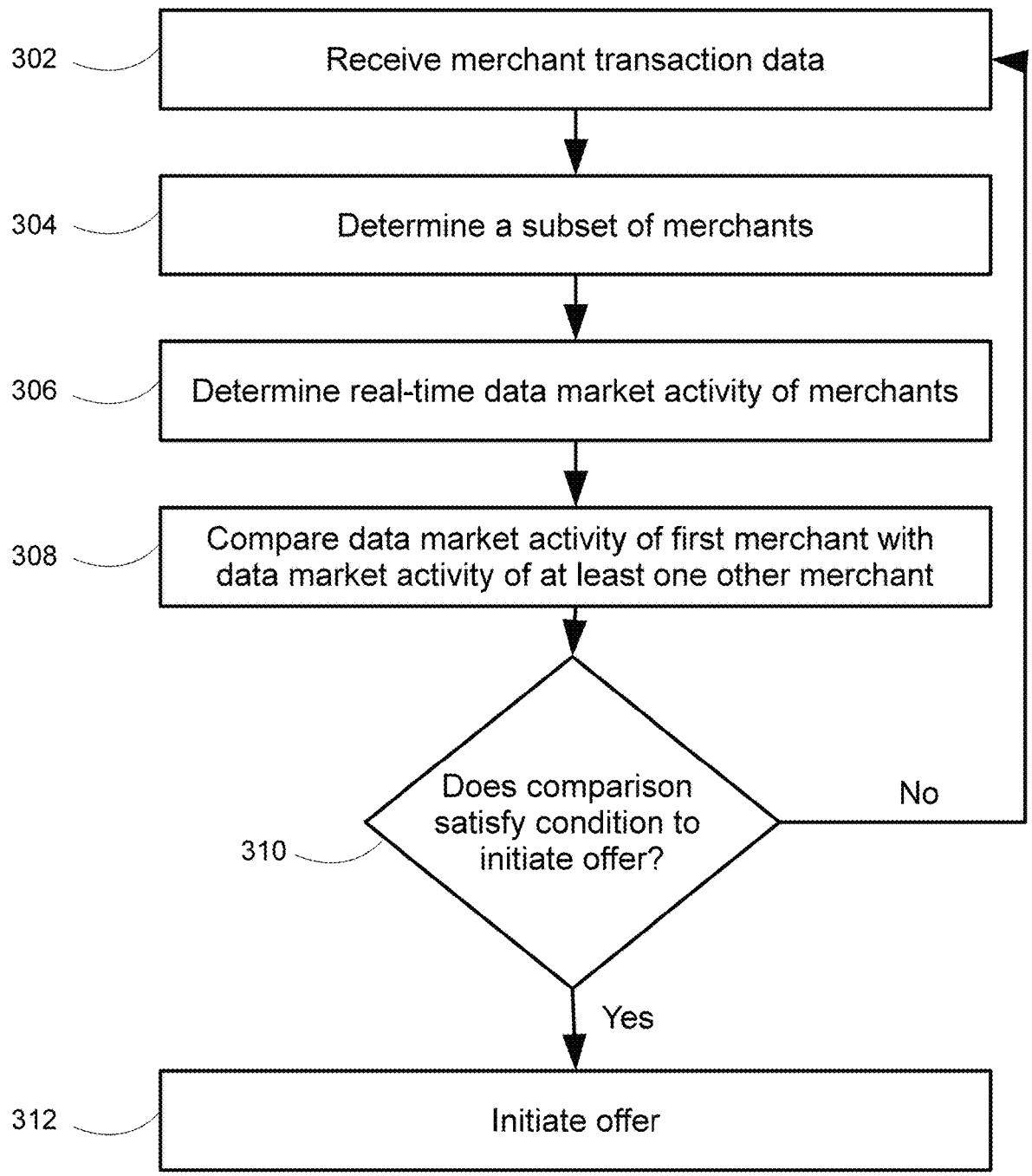
FIG. 3 is a flow diagram of a method of providing offers based on real-time data according to a non-limiting embodiment.

Referring now to FIG. 3, a flow diagram for a method of providing real-time offers based on geolocation and merchant category is shown according to non-limiting embodiments. At step 302, transaction data is received for at least one transaction from at least one merchant. The transaction data may be associated with a plurality of transactions from a plurality of merchants. The transaction data may include the merchant category of the merchant, merchant identifier, account identifier, geolocation, time stamp, and/or transaction amount.

With continued reference to FIG. 3, at step 304, a subset of merchants is determined from the plurality of merchants. The subset of merchants may be determined based on the merchant category and/or the geolocation of the merchant. The subset of merchants may include merchants within the same merchant category of the first merchant and are located within a predetermined radial distance from the first merchant.

With continued reference to FIG. 3, at step 306, the real-time market activity data of the first merchant and the subset of merchants is determined. The real-time market activity data may include the number of transactions and/or the value of the transactions within a predetermined time period. The real-time market activity data may be determined continually or continuously, or at predetermined time intervals.

With continued reference to FIG. 3, at step 308, the market activity data of the first merchant may be compared with the market activity data of at least one other merchant within the subset of merchants. The market activity data of the first merchant may be compared with the market activity data of all merchants within the subset of merchants. The market activity data being compared may include the number of transactions or the value of the transactions of each merchant.

With continued reference to FIG. 3, at step 310, it is determined if the comparison satisfies the condition to initiate the offer. In non-limiting embodiments, the condition may require that the number of transactions or the value of the transactions for the first merchant are equal to or less than the number of transactions or value of transactions for at least one other merchant within the subset of merchants. In other non-limiting embodiments, the condition may require that the ratio of the number of transactions or the value of the transactions for the first merchant to the total number of transactions or the value of the transactions for all merchants within the subset of merchants is equal to or below a predetermined value. If the condition is met, then the method may continue to step 312. If the condition is not met, the method may return to step 302. In non-limiting embodiments, after a subset of merchants has been determined for a particular first merchant, the method may receive the merchant transaction data for only the merchants already within the subset of merchants.

With continued reference to FIG. 3, at step 312, an offer is initiated. The offer may be initiated by sending the offer to a user device. The offer may be sent only to user devices within a predetermined radial distance from the physical location of the first merchant. The offer may be sent to user devices based on user addresses within a predetermined distance from the first merchant. The offer may be sent to a predetermined list of users.

Figure 4:
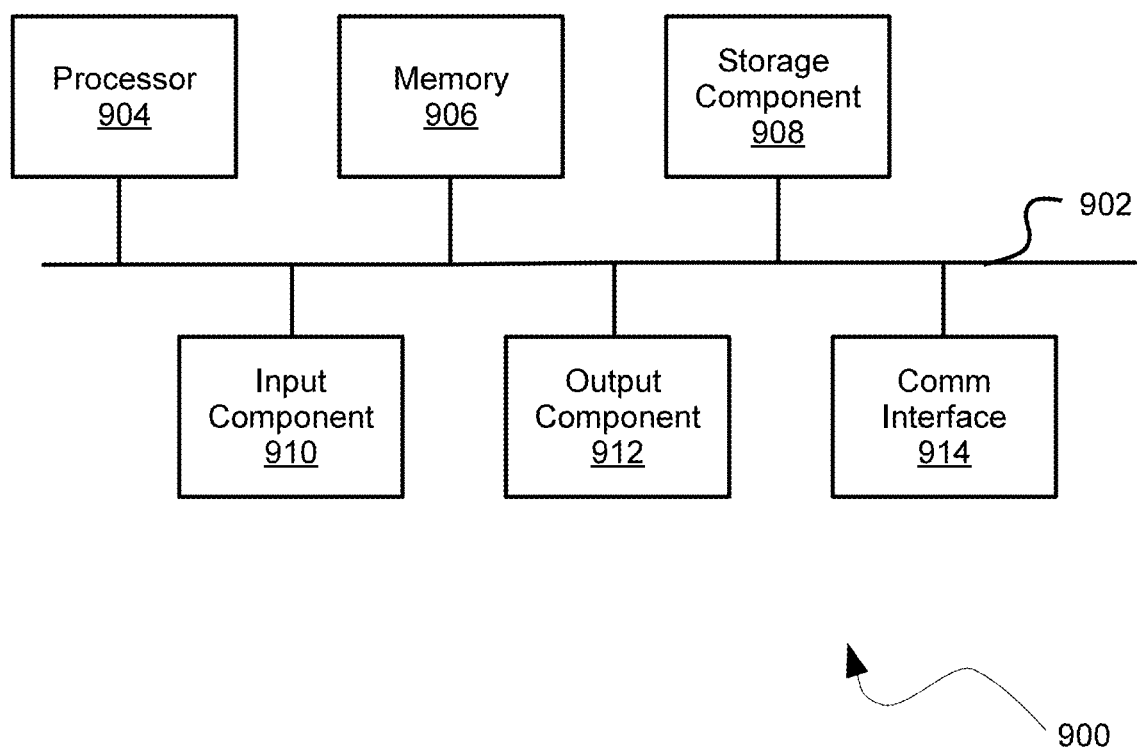
FIG. 4 is a diagram of one or more components, devices, and/or systems according to non-limiting embodiments.

Referring now to FIG. 4, shown is a diagram of example components of a device 900 according to non-limiting embodiments. Device 900 may correspond to the first merchant point-of-sale device 102, merchant point-of-sale devices 104a, 104b, 104c, server computer 106, transaction database 108, and user device 110 shown in FIG. 1, and/or the server computer system 250, transaction processing system 230, geo-intelligent aggregation engine 224, offer generator 226, offer system 220, transaction database 208, user device 210, point-of-sale devices of the first merchant 202 and the point-of-sale devices of other merchants 204a, 204b in shown in FIG. 2. In some non-limiting embodiments, such systems or devices may include at least one device 900 and/or at least one component of device 900. The number and arrangement of components shown in FIG. 4 are provided as an example. In some non-limiting embodiments, device 900 may include additional components, fewer components, different components, or differently arranged components than those shown in FIG. 4. Additionally, or alternatively, a set of components (e.g., one or more components) of device 900 may perform one or more functions described as being performed by another set of components of device 900.

As shown in FIG. 4, device 900 may include a bus 902, a processor 904, memory 906, a storage component 908, an input component 910, an output component 912, and a communication interface 914. Bus 902 may include a component that permits communication among the components of device 900. In some non-limiting embodiments, processor 904 may be implemented in hardware, firmware, or a combination of hardware and software. For example, processor 904 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 906 may include random access memory (RAM), read only memory (ROM), and/or another type of dynamic or static storage device (e.g., flash memory, magnetic memory, optical memory, etc.) that stores information and/or instructions for use by processor 904.

With continued reference to FIG. 4, storage component 908 may store information and/or software related to the operation and use of device 900. For example, storage component 908 may include a hard disk (e.g., a magnetic disk, an optical disk, a magneto-optic disk, a solid state disk, etc.) and/or another type of computer-readable medium. Input component 910 may include a component that permits device 900 to receive information, such as via user input (e.g., a touch screen display, a keyboard, a keypad, a mouse, a button, a switch, a microphone, etc.). Additionally, or alternatively, input component 910 may include a sensor for sensing information (e.g., a global positioning system (GPS) component, an accelerometer, a gyroscope, an actuator, etc.). Output component 912 may include a component that provides output information from device 900 (e.g., a display, a speaker, one or more light-emitting diodes (LEDs), etc.). Communication interface 914 may include a transceiver-like component (e.g., a transceiver, a separate receiver and transmitter, etc.) that enables device 900 to communicate with other devices, such as via a wired connection, a wireless connection, or a combination of wired and wireless connections. Communication interface 914 may permit device 900 to receive information from another device and/or provide information to another device. For example, communication interface 914 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 900 may perform one or more processes described herein. Device 900 may perform these processes based on processor 904 executing software instructions stored by a computer-readable medium, such as memory 906 and/or storage component 908. A computer-readable medium may include any non-transitory memory device. A memory device includes memory space located inside of a single physical storage device or memory space spread across multiple physical storage devices. Software instructions may be read into memory 906 and/or storage component 908 from another computer-readable medium or from another device via communication interface 914. When executed, software instructions stored in memory 906 and/or storage component 908 may cause processor 904 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment, and one or more steps may be taken in a different order than presented in the present invention.

The invention claimed is:

1. A computer-implemented method for providing offers based on real-time data, comprising:
receiving, with at least one processor, transaction data associated with a plurality of transactions conducted by a plurality of merchants, each merchant of the plurality of merchants associated with a physical location and at least one merchant category, the plurality of merchants comprising a first merchant associated with at least one first merchant category;
determining, with at least one processor, a subset of merchants of the plurality of merchants that are: (i) associated with physical locations within a threshold distance of a physical location associated with the first merchant and (ii) associated with the at least one first merchant category;
determining, with at least one processor, real-time market activity data associated with the first merchant and each merchant of the subset of merchants;
determining, with at least one processor, a threshold amount based on at least one dynamic parameter;
determining, with at least one processor, to initiate at least one offer based on comparing the real-time market activity data associated with the first merchant with the real-time market activity data associated with at least one other merchant of the subset of merchants, and determining that a ratio of the real-time market activity data associated with the first merchant to the real-time market activity data associated with the at least one other merchant satisfies the threshold amount;
initiating the at least one offer in response to determining to initiate the at least one offer, wherein the at least one offer is continuously or continually ongoing until being terminated, and wherein comparing the real-time market activity data comprises:

generating, with at least one processor, a merchant-transaction index comprising at least one data structure comprising at least one transaction associated with a merchant identifier, a time stamp, and a transaction amount;

calculating, with at least one processor, a first sum of all transactions within a threshold time period for each merchant of the plurality of merchants that matches the merchant category and is within the threshold distance;

calculating, with at least one processor, a second sum of all transactions for the first merchant within the threshold time period;

calculating, with at least one processor, a total sum by adding the first sum to the second sum; and dividing, with at least one processor, the second sum by the total sum;

determining, with at least one processor, updated real-time market activity data associated with the first merchant and each merchant of the subset of merchants;

after initiating the at least one offer, determining, with at least one processor, to terminate the at least one offer based on comparing the updated real-time market activity data associated with the first merchant with the updated real-time market activity data associated with the at least one other merchant of the subset of merchants and determining that a ratio of the updated real-time market activity data associated with the first merchant to the updated real-time market activity data associated with the at least one other merchant does not satisfy the threshold amount; and terminating the at least one offer in response to determining to terminate the at least one offer.

2. The computer-implemented method of claim 1, wherein determining the subset of merchants comprises:
generating, with at least one processor, geographical coordinates for each merchant of the plurality of merchants based on a geohash algorithm;
generating, with at least one processor, a merchant index comprising the geographical coordinates for each merchant;
identifying, with at least one processor, geographical coordinates for the first merchant; and
determining, with at least one processor, at least one related merchant of the merchant index based on the geographical coordinates for the first merchant, the geographical coordinates of the at least one related merchant, and the threshold distance.

3. The computer-implemented method of claim 1, further comprising determining the threshold amount based on historical transaction data and at least one machine learning algorithm.

4. The computer-implemented method of claim 1, further comprising determining the threshold amount based on a time or date.

5. The computer-implemented method of claim 1, wherein initiating the at least one offer comprises communicating an advertisement to at least one computing device within a predetermined distance from the first merchant.

6. A system for providing offers based on real-time data, the system comprising at least one server computer including at least one processor, the at least one server computer programed and/or configured to:
receive transaction data associated with a plurality of transactions conducted by a plurality of merchants, each merchant of the plurality of merchants associated with a physical location and at least one merchant category, the plurality of merchants comprising a first merchant associated with at least one first merchant category;

determine a subset of merchants of the plurality of merchants that are: (i) associated with physical locations within a threshold distance of a physical location associated with the first merchant and (ii) associated with the at least one first merchant category;

determine real-time market activity data associated with the first merchant and each merchant of the subset of merchants;

determine a threshold amount based on at least one dynamic parameter;

determine whether to initiate at least one offer based on comparing the real-time market activity data associated with the first merchant with the real-time market activity data associated with at least one other merchant of the subset of merchants, and determine that a ratio of the real-time market activity data associated with the first merchant to the real-time market activity data associated with the at least one other merchant satisfies the threshold amount;

initiate the at least one offer in response to determining to initiate the at least one offer, wherein the at least one offer is continuously or continually ongoing until being terminated, wherein comparing the real-time market activity data comprises:
generating a merchant-transaction index comprising at least one data structure comprising at least one transaction associated with a merchant identifier, a time stamp, and a transaction amount;
calculating a first sum of all transactions within a threshold time period for each merchant of the plurality of merchants that matches the merchant category and is within the threshold distance;
calculating a second sum of all transactions for the first merchant within the threshold time period;
calculating a total sum by adding the first sum to the second sum; and
dividing the second sum by the total sum;

determine updated real-time market activity data associated with the first merchant and each merchant of the subset of merchants;

after initiating the at least one offer, determine to terminate the at least one offer based on comparing the updated real-time market activity data associated with the first merchant with the updated real-time market activity data associated with the at least one other merchant of the subset of merchants and determining that a ratio of the updated real-time market activity data associated with the first merchant to the updated real-time market activity data associated with the at least one other merchant does not satisfy the threshold amount; and terminate the at least one offer in response to determining to terminate the at least one offer.

7. The system of claim 6, wherein the at least one server computer is programmed and/or configured to, when determining the subset of merchants:
generate geographical coordinates for each merchant of the plurality of merchants based on a geohash algorithm;
generate a merchant index comprising the geographical coordinates for each merchant;

identify geographical coordinates for the first merchant; and determine at least one related merchant of the merchant index based on the geographical coordinates for the first merchant, the geographical coordinates of the at least one related merchant, and the threshold distance.

8. The system of claim 6, wherein the at least one server computer is programed and/or configured to, when initiating the at least one offer, communicate an advertisement to at least one computing device within a predetermined distance from the first merchant.

9. A computer program product for providing offers based on real-time data, comprising at least one non-transitory computer-readable medium including program instructions that, when executed by at least one processor, cause the at least one processor to:

receive transaction data associated with a plurality of transactions conducted by a plurality of merchants, each merchant of the plurality of merchants associated with a physical location and at least one merchant category, the plurality of merchants comprising a first merchant associated with at least one first merchant category;

determine a subset of merchants of the plurality of merchants that are: (i) associated with physical locations within a threshold distance of a physical location associated with the first merchant and (ii) associated with the at least one first merchant category;

determine real-time market activity data associated with the first merchant and each merchant of the subset of merchants;

determine a threshold amount based on at least one dynamic parameter;

determine to initiate at least one offer based on comparing market activity data associated with the first merchant with the real-time market activity data associated with at least one other merchant of the subset of merchants, and determine that a ratio of the real-time market activity data associated with the first merchant to the real-time market activity data associated with the at least one other merchant satisfies the threshold amount;

initiate the at least one offer in response to determining to initiate the at least one offer, wherein the at least one offer is continuously or continually ongoing until being terminated, wherein comparing the real-time market activity data comprises:

generating a merchant-transaction index comprising at least one data structure comprising at least one transaction associated with a merchant identifier, a time stamp, and a transaction amount;

calculating a first sum of all transactions within a threshold time period for each merchant of the plurality of merchants that matches the merchant category and is within the threshold distance;

calculating a second sum of all transactions for the first merchant within the threshold time period;

calculating a total sum by adding the first sum to the second sum; and dividing the second sum by the total sum;

determine updated real-time market activity data associated with the first merchant and each merchant of the subset of merchants;

after initiating the at least one offer, determine to terminate the at least one offer based on comparing the updated real-time market activity data associated with the first merchant with the updated real-time market activity data associated with the at least one other merchant of the subset of merchants and determining that a ratio of the updated real-time market activity data associated with the first merchant to the updated real-time market activity data associated with the at least one other merchant does not satisfy the threshold amount; and terminate the at least one offer in response to determining to terminate the at least one offer.

10. The computer program product of claim 9, wherein the program instructions further cause the at least one processor to, when determining the subset of merchants:

generate geographical coordinates for each merchant of the plurality of merchants based on a geohash algorithm;

generate a merchant index comprising the geographical coordinates for each merchant;

identify geographical coordinates for the first merchant; and determine at least one related merchant of the merchant index based on the geographical coordinates for the first merchant, the geographical coordinates of the at least one related merchant, and the threshold distance.

11. The computer program product of claim 9, wherein the program instructions further cause the at least one processor to, when initiating the at least one offer, communicate an advertisement to at least one computing device within a predetermined distance from the first merchant.

12. The system of claim 6, wherein determining the threshold amount is based at least partially on historical transaction data and at least one machine learning algorithm.

13. The system of claim 6, wherein determining the threshold amount is based at least partially on a time or date.

14. The computer program product of claim 9, wherein determining the threshold amount is based at least partially on historical transaction data and at least one machine learning algorithm.

15. The computer program product of claim 9, wherein determining the threshold amount is based at least partially on a time or date.

* * * * *